United States Patent
Daily et al.

(10) Patent No.: US 8,631,699 B2
(45) Date of Patent: Jan. 21, 2014

(54) SENSOR SUBSYSTEM FOR A LIGHTING ASSEMBLY

(75) Inventors: Christopher George Daily, Harrisburg, PA (US); Matthew Edward Mostoller, Hummelstown, PA (US); Osenaga Jerry Osagie, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 272 days.

(21) Appl. No.: 13/028,395

(22) Filed: Feb. 16, 2011

(65) Prior Publication Data

US 2012/0204637 A1 Aug. 16, 2012

(51) Int. Cl.
*G01D 11/24* (2006.01)
*G01L 19/14* (2006.01)
*G01P 1/02* (2006.01)

(52) U.S. Cl.
USPC ........................................................ 73/431

(58) Field of Classification Search
USPC .............................. 73/431, 855, 856; 220/3.3
See application file for complete search history.

(56) References Cited

U.S. PATENT DOCUMENTS

| 7,412,900 | B2 * | 8/2008 | Santos et al. ................... 73/856 |
| 2007/0074583 | A1 * | 4/2007 | Santos et al. ................... 73/856 |
| 2009/0278544 | A1 * | 11/2009 | Webb ............................ 324/416 |

FOREIGN PATENT DOCUMENTS

| DE | 198 04 165 A1 | 2/1999 |
| DE | 10 2006 022968 A1 | 11/2007 |
| EP | 0 836 079 A1 | 4/1998 |

OTHER PUBLICATIONS

International Search Report, International Application No. PCT 2012/000084, International Filing Date Feb. 13, 2012.

* cited by examiner

*Primary Examiner* — Lisa Caputo
*Assistant Examiner* — Roger Hernandez-Prewitt (57) ABSTRACT

A sensor module includes a housing having a top and a bottom. A mounting surface is positioned proximate to the bottom of the housing. A sensor is positioned within the housing. A fixed component extends from the top of the housing. A moveable component is provided having a mounting surface. The moveable component is selectively coupled to the fixed component to variably position the mounting surface of the moveable component relative to the mounting surface of the housing.

20 Claims, 11 Drawing Sheets

SENSOR SUBSYSTEM FOR A LIGHTING ASSEMBLY

FIELD OF THE INVENTION

The subject matter described herein relates to a sensor subsystem for a lighting assembly.

BACKGROUND OF THE INVENTION

Lighting assemblies generally include a driver module and at least one lighting module. The lighting module may include solid state lighting, for example, light emitting diodes (LEDs). The driver provides power to the lighting modules. Some lighting assemblies may include a sensor subsystem to control the lighting assembly. The sensor subsystem may be electrically coupled directly to the lighting module or between the lighting module and the driver. The sensor subsystem controls the lighting assembly by directing signals to the lighting module. For example, the sensor subsystem may control the lighting module by turning the lighting module on or off, dimming the lighting module, or increasing a current to the lighting module to produce a higher intensity of light.

Sensor subsystems may be used with an occupancy sensor that detects the presence of an individual within a room. When the individual is detected by the sensor, the sensor subsystem directs a signal to the lighting assembly to turn on the lights in the room. In other examples, sensor subsystems may be used to detect smoke, carbon monoxide, carbon dioxide, and/or other dangerous conditions. In such an embodiment, the sensor subsystem may dim and/or flash the lights of the lighting module to indicate the presence of the dangerous condition.

However, existing sensor subsystems are not without their disadvantages. The sensor subsystem generally includes a control module with a sensor module in a control module housing. The control module is generally hardwired to the sensor module within the control module housing. Such sensor subsystems are typically difficult to repair and must be replaced when one of the components of either the sensor module or the control module becomes damaged. Moreover, the sensor subsystem is generally bulky and difficult to install in tight spaces. For example, the sensor subsystem may be coupled to a substrate such as a wall, a ceiling, a fixture, or the like. The common housing for the sensor module and the control module cause difficulty when installing the sensor subsystem. Additionally, existing sensor subsystems are not adaptable to substrates of varying thickness. Accordingly, the sensor subsystem may be crudely installed and subject to becoming dislodged.

A need remains for a sensor subsystem capable of installation in confined spaces. Another need remains for a sensor subsystem that is adaptable to substrates of varying size.

SUMMARY OF THE INVENTION

In one embodiment, a sensor module is provided. The sensor module includes a housing having a top and a bottom. A mounting surface is positioned proximate to the bottom of the housing. A sensor is positioned within the housing. A fixed component extends from the top of the housing. A moveable component is provided having a mounting surface. The moveable component is selectively coupled to the fixed component to variably position the mounting surface of the moveable component relative to the mounting surface of the housing.

In another embodiment, a sensor module is provided. The sensor module includes a housing having a top and a bottom. A mounting surface is positioned proximate to the bottom of the housing. A sensor is positioned within the housing. A latch extends from the top of the housing. A sleeve is provided having a mounting surface. The sleeve is selectively coupled to the latch to variably position the mounting surface of the sleeve relative to the mounting surface of the housing.

In another embodiment, a sensor subsystem is provided having a control module and a sensor module. The sensor module includes a housing having a top and a bottom. A mounting surface is positioned proximate to the bottom of the housing. A sensor is positioned within the housing. A fixed component extends from the top of the housing. A moveable component is provided having a mounting surface. The moveable component is selectively coupled to the fixed component to variably position the mounting surface of the moveable component relative to the mounting surface of the housing. A cable assembly couples the control module to the sensor module.

DETAILED DESCRIPTION OF THE INVENTION

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The embodiments described herein relate to a sensor subsystem that is configured to operate with a lighting assembly. The sensor subsystem includes a sensor module that is separate from a control module. The sensor module and the control module are electrically coupled with a cable assembly that is removeably attached to at least one of the sensor module or the control module. By separating the control module and the sensor module, the sensor module is capable of being installed in confined areas. For example, the sensor module may be installed in a ceiling panel while the control module is remotely coupled to a ceiling joist. The sensor module and the control module also include connectors that enable tool-less installation of the sensor subsystem. Additionally, the connectors enable the sensor module and/or control module to be replaced and/or repaired without removing the entire sensor subsystem. The embodiments described herein further enable the sensor modules to be secured to substrates having varying thicknesses.

Figure 1:
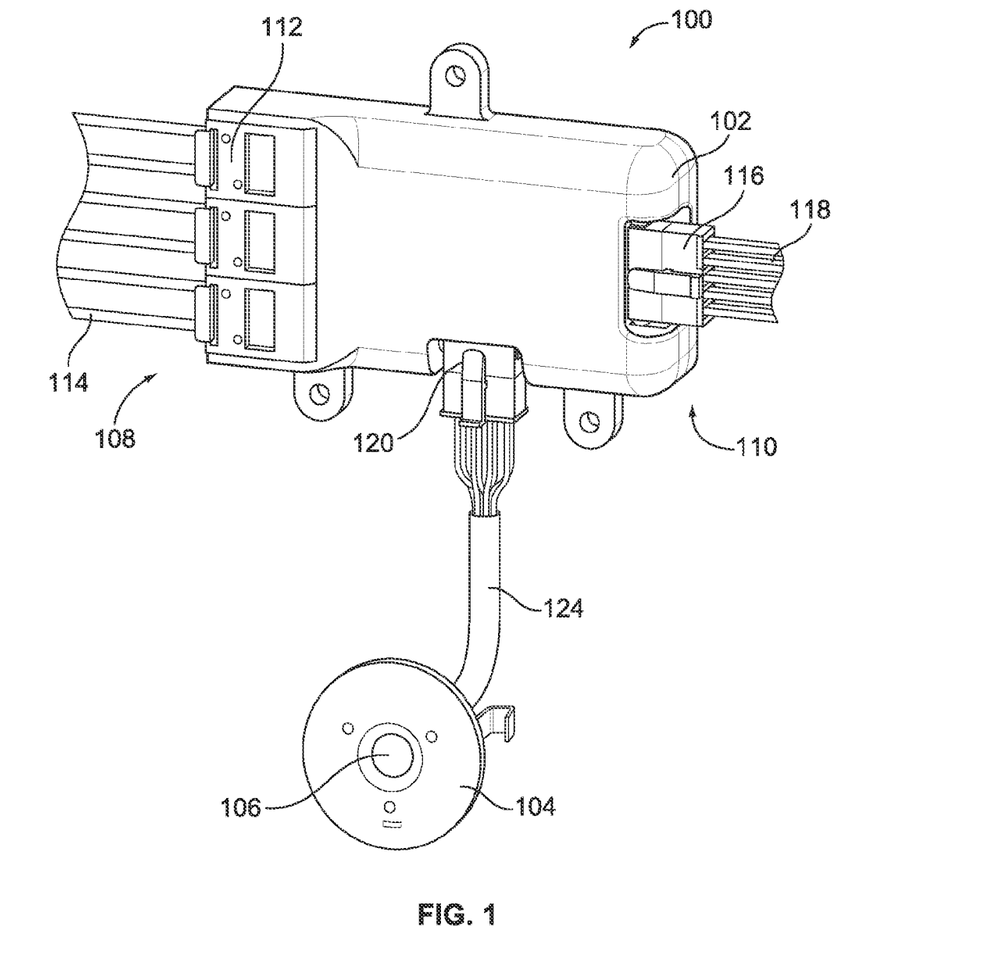
FIG. 1 is a top perspective view of a sensor subsystem formed in accordance with an embodiment.

FIG. 1 is a top perspective view of a sensor subsystem 100 formed in accordance with an embodiment. The sensor subsystem 100 is configured to be used with a lighting assembly (not shown), for example, an LED lighting assembly. The lighting assembly may include a lighting module and a driver module to power the lighting module. The sensor subsystem 100 may be electrically coupled to the lighting module or between the driver module and the lighting module. The sensor subsystem 100 is configured to control the lighting module. For example, the sensor subsystem 100 may be configured to turn the lighting module on or off. In another embodiment, the sensor subsystem 100 may be configured to dim the lights of the lighting module, brighten the lights of the lighting module, and/or flash the lights of the lighting module.

The sensor subsystem 100 includes a control module 102 and a sensor module 104 separate and distinct from the control module 102. The sensor module 104 includes a sensor 106 that detects the occurrence of an event. For example, the sensor 106 may be an occupancy sensor configured to detect the presence of an individual in a room. In other embodiments, the sensor 106 may detect smoke, carbon dioxide, carbon monoxide, or the like. The control module 102 controls the lighting module in response to a detected event.

The control module 102 includes a power end 108 and a lighting end 110. The power end 108 includes a power termination 112. The power termination 112 is electrically coupled to wires 114 extending from a power source (not shown). The power source provides power to the sensor subsystem 100. In the illustrated embodiment, the power termination 112 is a tool-less IDC termination. The power termination 112 may be configured to receive 18 to 24 gage wires 114. Alternatively, the power termination 112 may be configured to receive any suitable gage wires 114. In an alternative embodiment, the power termination 112 may be a modular jack connector assembly (shown in FIG. 20). In other embodiments, the power termination 112 may be any suitable termination for receiving wires 114 and/or cables.

The lighting end 110 of the control module 102 includes a lighting termination 116. The lighting termination 116 is electrically coupled to wires 118 that carry control signals from the control module 102 to the lighting module. In the illustrated embodiment, the lighting termination 116 includes a ten position connector. The lighting termination 116 may be any suitable connector in alternative embodiments.

The control module 102 includes a sensor connector 120. In one embodiment, the sensor connector 120 is an eight position connector. Alternatively, the sensor connector 120 may be any suitable connector. The sensor module 104 also includes a sensor connector 122 (shown in FIG. 4). In one embodiment, the sensor connector 122 is an eight position connector. Alternatively, the sensor connector 122 may be any suitable connector. A cable assembly 124 extends between the sensor connector 120 and the sensor connector 122 to electrically couple the control module 102 and the sensor module 104. In an exemplary embodiment, the cable assembly 124 is removeably coupled to the control module 102 and the sensor module 104. Alternatively, the cable assembly 124 may be hardwired to one of the control module 102 or the sensor module 104. The cable assembly 124 is removeably coupled to at least one of the sensor module 104 or the control module 102 to enable one of the control modules 102 and the sensor modules 104 to be replaced without replacing the entire sensor subsystem 100.

In the exemplary embodiment, the sensor module 104 may be configured for installation in sheet metal, such as a metal casing of a light fixture, dry wall, a ceiling panel, or the like. The control module 102 is configured to be installed remotely from the sensor module 104. The cable assembly 124 may be of varying length to accommodate installation of the sensor module 104 remote from the control module 102. For example, the sensor module 104 may be installed in a ceiling panel, while the control module 102 is remotely installed in a fixture or coupled to a ceiling joist or an internal surface of the light fixture.

Figure 2:
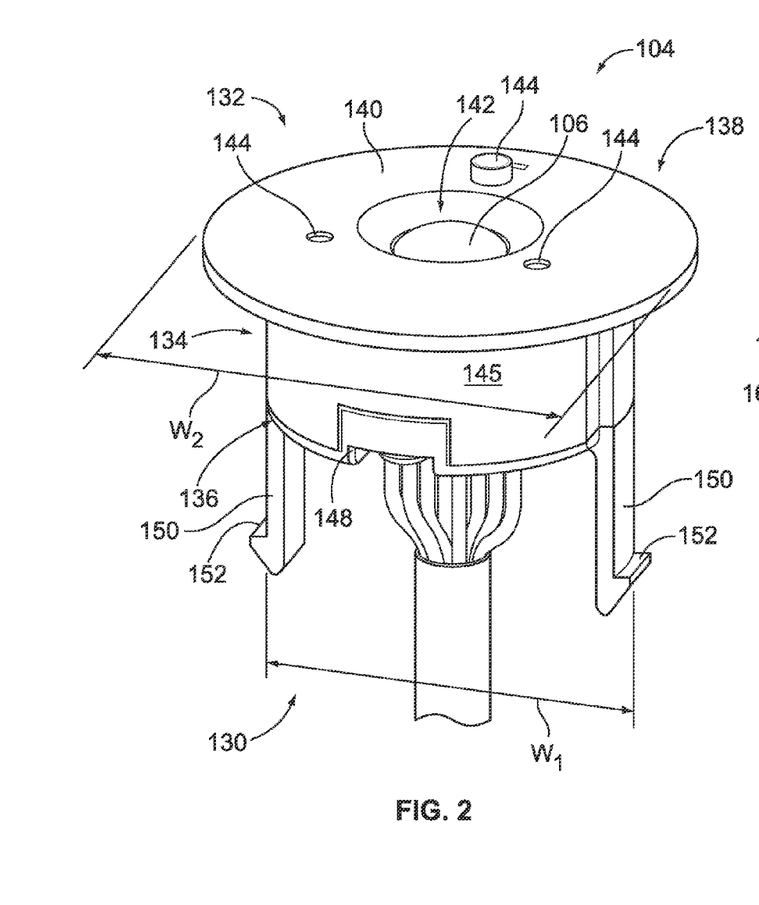
FIG. 2 is a side perspective view of a sensor module formed in accordance with an embodiment.

FIG. 2 is a side perspective view of the sensor module 104. The sensor module 104 includes a top 130 and a bottom 132. A housing 134 is positioned at the bottom 132 of the sensor module 104. The housing 134 includes a top 136 and a bottom 138. A module face 140 extends along the bottom 138 of the housing 134. The module face 140 includes a sensor opening 142 extending therethrough. The sensor 106 extends through the sensor opening 142. Openings 144 are positioned around the sensor opening 142. The openings 144 may be configured with a lens or the like. A body 146 of the housing 134 extends from the module face 140 toward the top 136 of the housing 134. The body 146 has a cross-sectional width $W_1$ that is less than a cross-sectional width $W_2$ of the module face 140 so that the module face 140 extends outward from the body 146.

A module cover 148 is coupled to the body 146 of the housing 134. The module cover 148 is coupled to the top 136 of the housing 134. The cable assembly 124 is inserted into the module cover 148. The module cover 148 includes fixed components 150 extending therefrom. The fixed components 150 are formed integrally with the module cover 148. Alternatively, the fixed components 150 may be formed separately from the module cover 148 and coupled thereto. In the illustrated embodiment, the fixed components 150 are latches that extend from the top 130 of the sensor module 104. The latches include a latching surface 152 formed at an end thereof.

Figure 3:
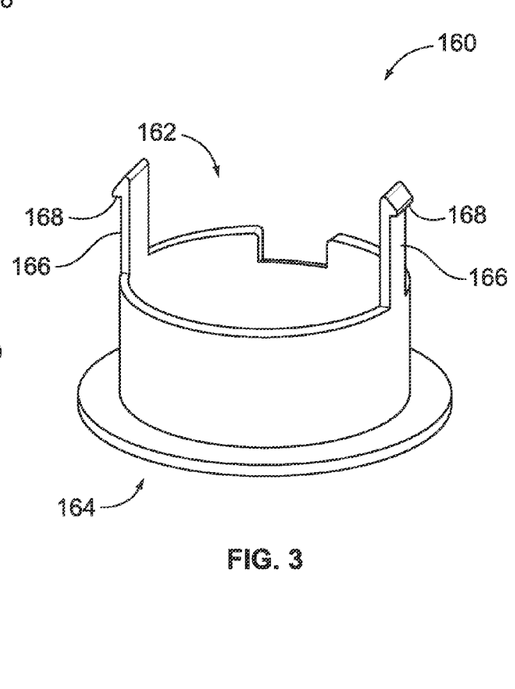
FIG. 3 is a side perspective view of a housing for a sensor module formed in accordance with an alternative embodiment.

FIG. 3 is a side perspective view of a housing 160 formed in accordance with an alternative embodiment. The housing 160 may be utilized with the sensor module 104 (shown in FIG. 1). The housing 160 includes a top 162 and a bottom 164. Fixed components 166 extend from the top 162 of the housing 160. The fixed components 166 may be formed integrally with the housing 160. Alternatively, the fixed components 166 may be formed separately and coupled to the housing 160. In the illustrated embodiment, the fixed components 166 are latches having a latching surface 168 formed at an end thereof.

Figure 4:
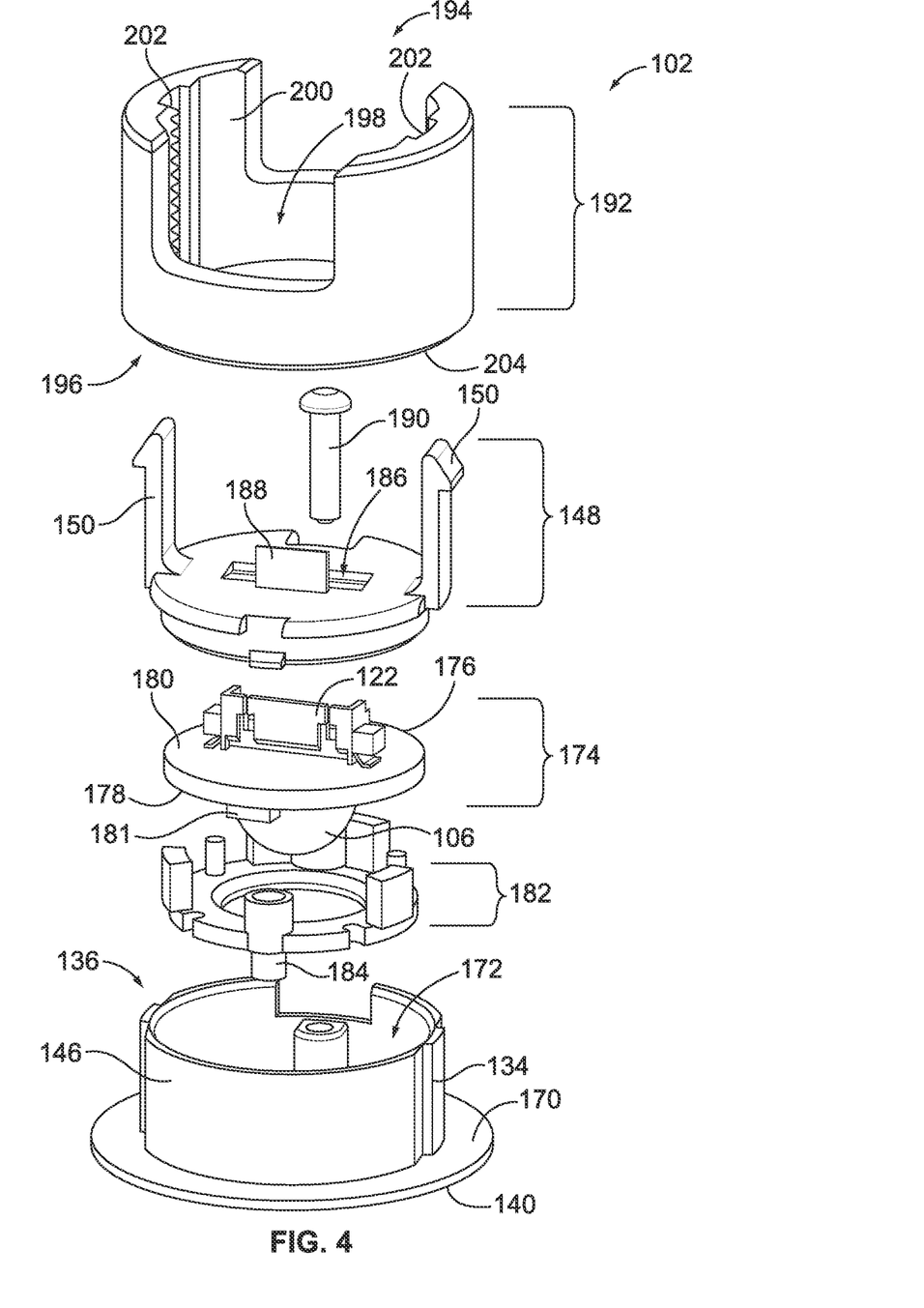
FIG. 4 is an exploded view of the sensor module shown in FIG. 2 and having a moveable component.

FIG. 4 is an exploded view of the sensor module 102 including a moveable component 192. The housing 134 includes a mounting surface 170 extending along the module face 140. The mounting surface 170 extends around the body 146 of the housing 134. The mounting surface 170 is configured to engage a substrate (not shown) when the sensor module 104 is installed. For example, the substrate may include sheet metal, dry wall, ceiling panels, or the like.

A cavity 172 extends through the body 146 of the housing 134. The cavity 172 is open at the top 136 of the housing 134. The cavity 172 is configured to receive a sensor assembly 174. The sensor assembly 174 includes a circuit board 176. The circuit board 176 includes a mounting surface 178 and an opposite mating surface 180. The sensor 106 is coupled to the mounting surface 178 of the circuit board 176. The mounting surface 178 may also include additional components 181 coupled thereto. The components 181 may be LEDs or additional sensors. The sensor assembly 174 is inserted into the cavity 170 so that the sensor 106 extends through the sensor opening 142 (shown in FIG. 2) in the module face 140. A light pipe assembly 182 is positioned between the sensor assembly 174 and the module face 140. The light pipe assembly 182 includes light pipes 184 that align the components 181 with the openings 144 (shown in FIG. 2) in the module face 140.

The sensor connector 122 is coupled to the mating surface 180 of the circuit board 176. The sensor connector 122 extends through an opening 186 in the module cover 148, when the module cover 148 is joined to the housing 134. The module cover 148 includes a strain relief 188 positioned adjacent to the opening 186. The strain relief 188 latches to the cable assembly 124 (shown in FIG. 1), when the cable assembly 124 is coupled to the sensor connector 122. The strain relief 188 is configured to retain the cable assembly 124 in the sensor connector 122. The strain relief 188 provides relief from forces that may be imposed on the cable assembly 124. A screw 190 secures the module cover 148 to the housing 134.

The moveable component 192 is configured to secure to the fixed components 150. In an exemplary embodiment, the moveable component 192 is formed as a sleeve. The moveable component 192 includes a top 194 and a bottom 196. A cavity 198 extends through the moveable component 192 from the top 194 to the bottom 196. An inner surface 200 is defined by the cavity 198. A plurality of latching surfaces 202 extend along the inner surface 200 from the top 194 to the bottom 196 of the moveable component 192. A mounting surface 204 extends along the bottom 196 of the moveable component 192.

The fixed components 150 are configured to be inserted into the cavity 194 of the moveable component 192. The fixed components 150 engage the latching surfaces 202 of the moveable component 192 to secure the moveable component 192 to the fixed components 150. The moveable component 192 is selectively coupled to the fixed components 150 to variably position the mounting surface 204 of the moveable component 192 relative to the mounting surface 170 of the housing 134.

Figure 5:
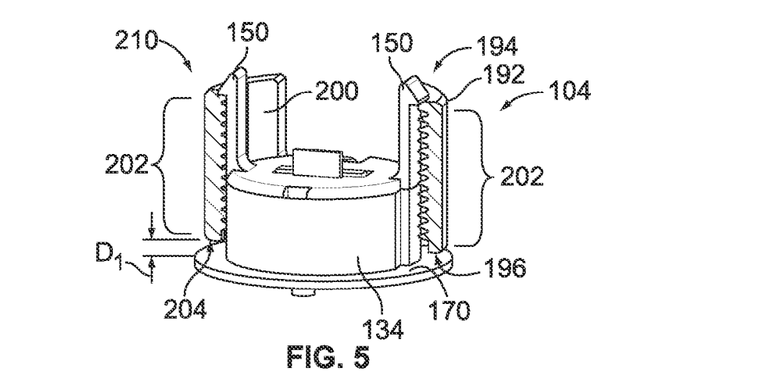
FIG. 5 is a side perspective view of the sensor module shown in FIG. 4 and having the moveable component in a first orientation.
Figure 6:
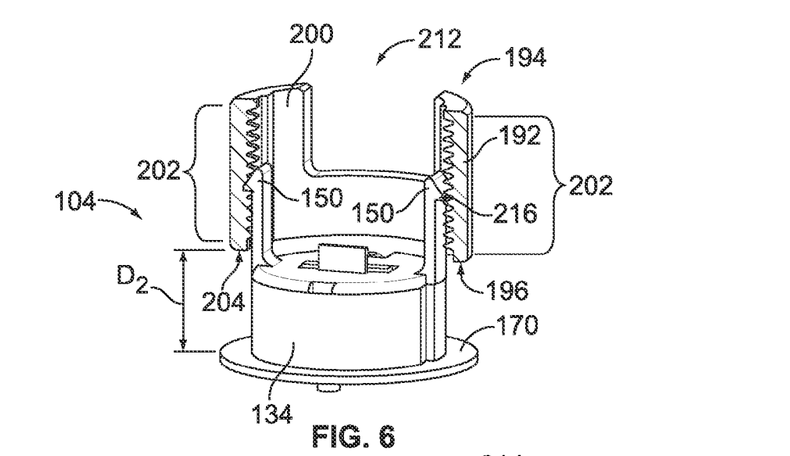
FIG. 6 is a side perspective view of the sensor module shown in FIG. 4 and having the moveable component in a second orientation.
Figure 7:
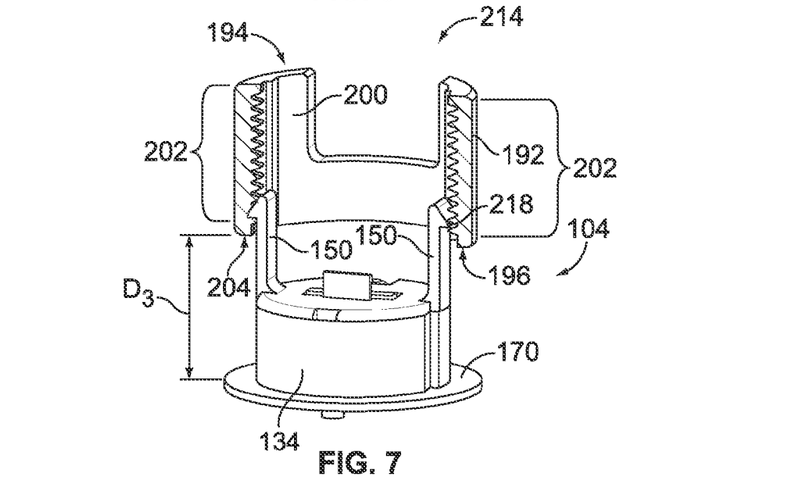
FIG. 7 is a side perspective view of the sensor module shown in FIG. 4 and having the moveable component in a third orientation.

FIG. 5 is a side perspective view of the sensor module 104 with the moveable component 192 in a first orientation 210. FIG. 6 is a side perspective view of the sensor module 104 with the moveable component 192 in a second orientation 212. FIG. 7 is a side perspective view of the sensor module 104 with the moveable component 192 in a third orientation 214. FIGS. 5-7 illustrate a cut-away view of the moveable component 192. The latching surfaces 202 extend from the top 194 to the bottom 196 of the moveable component 192. The latching surfaces 202 are aligned with the fixed components 150. The fixed components 150 may be secured to any of the latching surfaces 202 extending along the inner surface 200 of the moveable component 192 to selectively position the mounting surface 204 of the moveable component 192 relative to the mounting surface 170 of the housing 134.

In the first orientation 210 (shown in FIG. 5), the fixed component 150 is secured to the top 194 of the moveable component 192. The mounting surface 204 of the moveable component 192 is positioned a distance $D_1$ from the mounting surface 170 of the housing 134. The distance $D_1$ may be configured to secure the sensor module 104 to a thin substrate (not shown). For example, the distance $D_1$ may be configured to secure the sensor module 104 to a substrate such as sheet metal or the like. When the sensor module 104 is secured to the substrate, the mounting surface 170 of the housing 134 and the mounting surface 204 of the moveable component 192 abut opposite sides of the substrate to secure the sensor module 104 to the substrate.

In the second orientation 212 (shown in FIG. 6), the fixed component 150 is secured to a latching surface 202 at an intermediate position 216 between the top 194 and the bottom 196 of the moveable component 192. The mounting surface 204 of the moveable component 192 is positioned a distance $D_2$ from the mounting surface 170 of the housing 134. The distance $D_2$ may be configured to secure the sensor module 104 to a substrate such as dry wall, a ceiling panel, or the like. In one embodiment, the distance $D_2$ may be approximately one half of an inch. When the sensor module 104 is secured to the substrate, the mounting surface 170 of the housing 134 and the mounting surface 204 of the moveable component 192 abut opposite sides of the substrate to secure the sensor module 104 to the substrate.

In the third orientation 214 (shown in FIG. 7), the fixed component 150 is secured to a latching surface 202 at a position 218 proximate to the bottom 196 of the moveable component 192. The mounting surface 204 of the moveable component 192 is positioned a distance $D_3$ from the mounting surface 170 of the housing 134. The distance $D_3$ may be configured to secure the sensor module 104 to a substrate such as dry wall, a ceiling panel, or the like. In one embodiment, the distance $D_3$ may be approximately three fourths of an inch. When the sensor module 104 is secured to the substrate, the mounting surface 170 of the housing 134 and the mounting surface 204 of the moveable component 192 abut opposite sides of the substrate to secure the sensor module 104 to the substrate.

Figure 8:
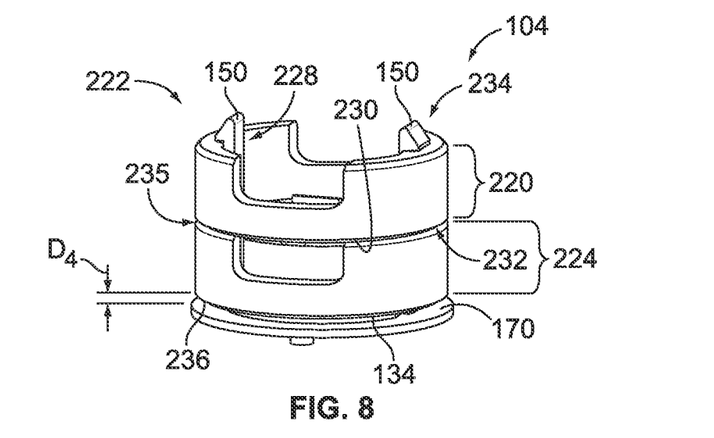
FIG. 8 is a side perspective view of the sensor module shown in FIG. 2 and having a moveable component formed in accordance with an alternative embodiment and in a first orientation with a spacer.
Figure 9:
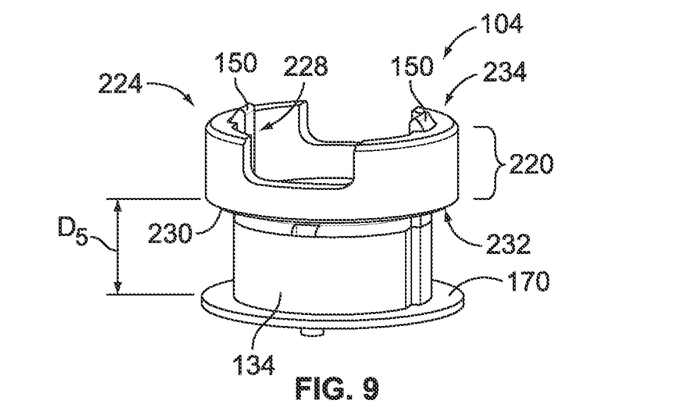
FIG. 9 is a side perspective view of the sensor module and the moveable component shown in FIG. 8 without the spacer.
Figure 10:
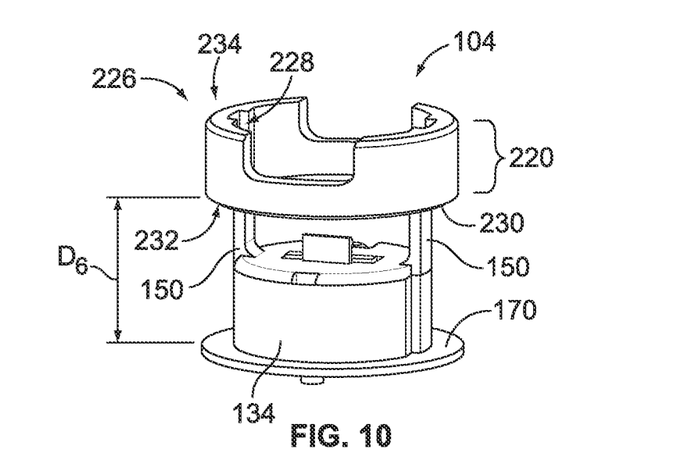
FIG. 10 is a side perspective view of the sensor module shown in FIG. 8 and having the moveable component in a second orientation.

FIG. 8 is a side perspective view of the sensor module 104 with a moveable component 220 formed in accordance with an alternative embodiment and in a first orientation 222 with a spacer 224. FIG. 9 is a side perspective view of the sensor module 104 and the moveable component 220 in the first orientation 222 without the spacer 224. FIG. 10 is a side perspective view of the sensor module 104 with the moveable component 220 is a second orientation 226. The moveable component 220 includes latching surfaces 228 extending from a top 234 to a bottom 232 of the moveable component 220. The latching surfaces 228 are aligned with the fixed components 150. The fixed components 150 may be secured to any of the latching surfaces 228 to selectively position a mounting surface 230 of the moveable component 220 relative to the mounting surface 170 of the housing 134.

FIG. 8 illustrates the fixed components 150 secured to the top 234 of the moveable component 220. The spacer 224 is positioned between the moveable component 220 and the mounting surface 170 of the housing 134. The spacer 224 includes a top 235 and a bottom mounting surface 236. The top 234 of the spacer 224 abuts the mounting surface 230 of the moveable component 220. The bottom mounting surface 236 of the spacer 224 is positioned a distance $D_4$ from the mounting surface 170 of the housing 134. The distance $D_4$ may be configured to secure the sensor module 104 to a thin substrate (not shown). For example, the distance $D_4$ may be configured to secure the sensor module 104 to a substrate such as sheet metal or the like. When the sensor module 104 is secured to the substrate, the mounting surface 170 of the housing 134 and the bottom mounting surface 236 of the spacer 224 abut opposite sides of the substrate to secure the sensor module 104 to the substrate.

FIG. 9 illustrates the fixed components 150 secured to the top 234 of the moveable component 220 without the spacer 224. The mounting surface 230 of the moveable component 220 is positioned a distance $D_5$ from the mounting surface 170 of the housing 134. The distance $D_5$ may be configured to secure the sensor module 104 to a substrate such as dry wall, a ceiling panel, or the like. In one embodiment, the distance $D_5$ may be approximately one half of an inch. When the sensor module 104 is secured to the substrate, the mounting surface 170 of the housing 134 and the mounting surface 230 of the moveable component 220 abut opposite sides of the substrate to secure the sensor module 104 to the substrate.

FIG. 10 illustrates the fixed components 150 secured to a latching surface 228 proximate to a bottom 232 of the moveable component 220. The mounting surface 230 of the moveable component 220 is positioned a distance $D_6$ from the mounting surface 170 of the housing 134. The distance $D_6$ may be configured to secure the sensor module 104 to a substrate such as dry wall, a ceiling panel, or the like. In one embodiment, the distance $D_6$ may be approximately three fourths of an inch. When the sensor module 104 is secured to the substrate, the mounting surface 170 of the housing 134 and the mounting surface 230 of the moveable component 220 abut opposite sides of the substrate to secure the sensor module 104 to the substrate.

Figure 11:
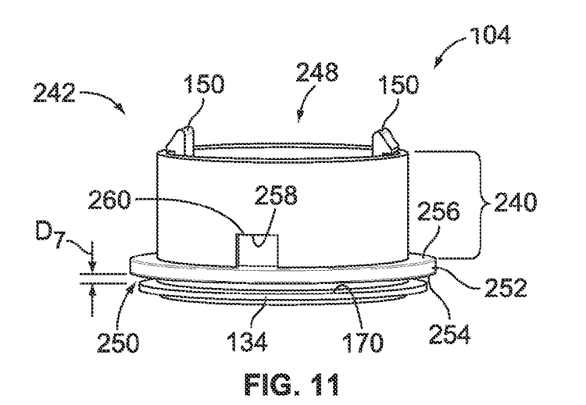
FIG. 11 is a side perspective view of the sensor module shown in FIG. 2 and having the moveable component formed in accordance with an alternative embodiment and in a first orientation.
Figure 12:
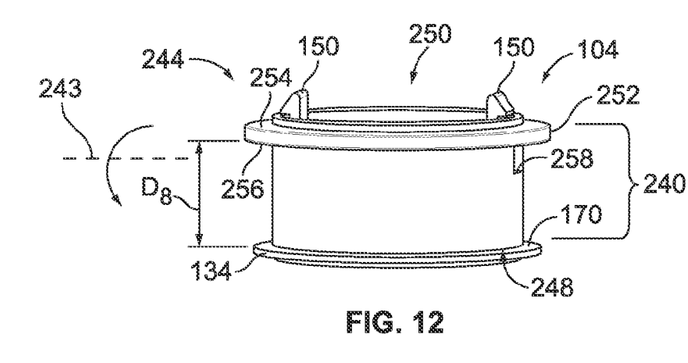
FIG. 12 is a side perspective view of the sensor module shown in FIG. 11 and having the moveable component in a second orientation.
Figure 13:
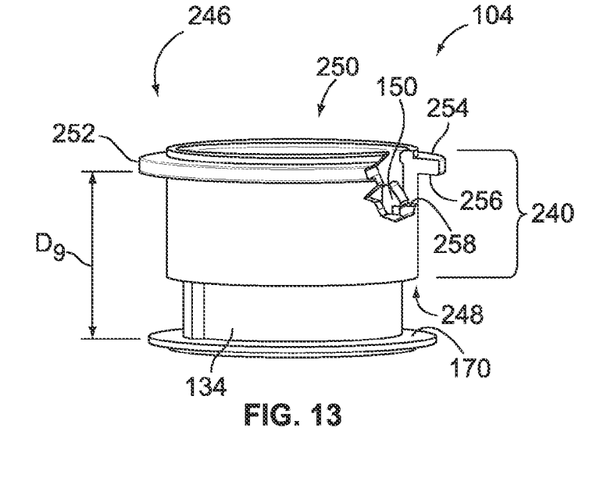
FIG. 13 is a side perspective view of the sensor module shown in FIG. 11 and having the moveable component in a third orientation.

FIG. 11 is a side perspective view of the sensor module 104 with a moveable component 240 formed in accordance with an alternative embodiment and in a first orientation 242. FIG. 12 is a side perspective view of the sensor module 104 with the moveable component 240 in a second orientation 244. FIG. 13 is a side perspective view of the sensor module 104 with the moveable component 240 in a third orientation 246.

The moveable component 240 includes a top 248 and a bottom 250. A flange 252 extends around the moveable component 240 proximate to the bottom 250 of the moveable component 240. The flange 252 includes a bottom mounting surface 254 and an opposite top mounting surface 256. A latching surface 258 is formed at an intermediate position 260 between the top 248 and the bottom 250 of the moveable component 240.

In the first orientation 242 (shown in FIG. 11), the fixed components 150 are secured to the top 248 of the moveable component 240. The bottom mounting surface 254 of the moveable component 240 is positioned a distance $D_7$ from the mounting surface 170 of the housing 134. The distance $D_7$ may be configured to secure the sensor module 104 to a thin substrate (not shown). For example, the distance $D_7$ may be configured to secure the sensor module 104 to a substrate such as sheet metal or the like. When the sensor module 104 is secured to the substrate, the mounting surface 170 of the housing 134 and the bottom mounting surface 254 of the moveable component 240 abut opposite sides of the substrate to secure the sensor module 104 to the substrate.

In the second orientation 244 (shown in FIG. 12), the moveable component 240 is rotated 180 degrees about an axis of rotation 243 from the first orientation 242. The fixed components 150 are secured to the bottom 250 of the moveable component 240. The top mounting surface 256 of the moveable component 240 is positioned a distance $D_8$ from the mounting surface 170 of the housing 134. The distance $D_8$ may be configured to secure the sensor module 104 to a substrate such as dry wall, a ceiling panel, or the like. In one embodiment, the distance $D_8$ may be approximately one half of an inch. When the sensor module 104 is secured to the substrate, the mounting surface 170 of the housing 134 and the top mounting surface 256 of the moveable component 240 abut opposite sides of the substrate to secure the sensor module 104 to the substrate.

In the third orientation 246 (shown in FIG. 12), the moveable component 240 is rotated 180 degrees from the first orientation 242. The fixed components 150 are secured to the latching surface 258 of the moveable component 240. The top mounting surface 256 of the moveable component 240 is positioned a distance $D_9$ from the mounting surface 170 of the housing 134. The distance $D_9$ may be configured to secure the sensor module 104 to a substrate such as dry wall, a ceiling panel, or the like. In one embodiment, the distance $D_9$ may be approximately three fourths of an inch. When the sensor module 104 is secured to the substrate, the mounting surface 170 of the housing 134 and the top mounting surface 256 of the moveable component 240 abut opposite sides of the substrate to secure the sensor module 104 to the substrate.

Figure 14:
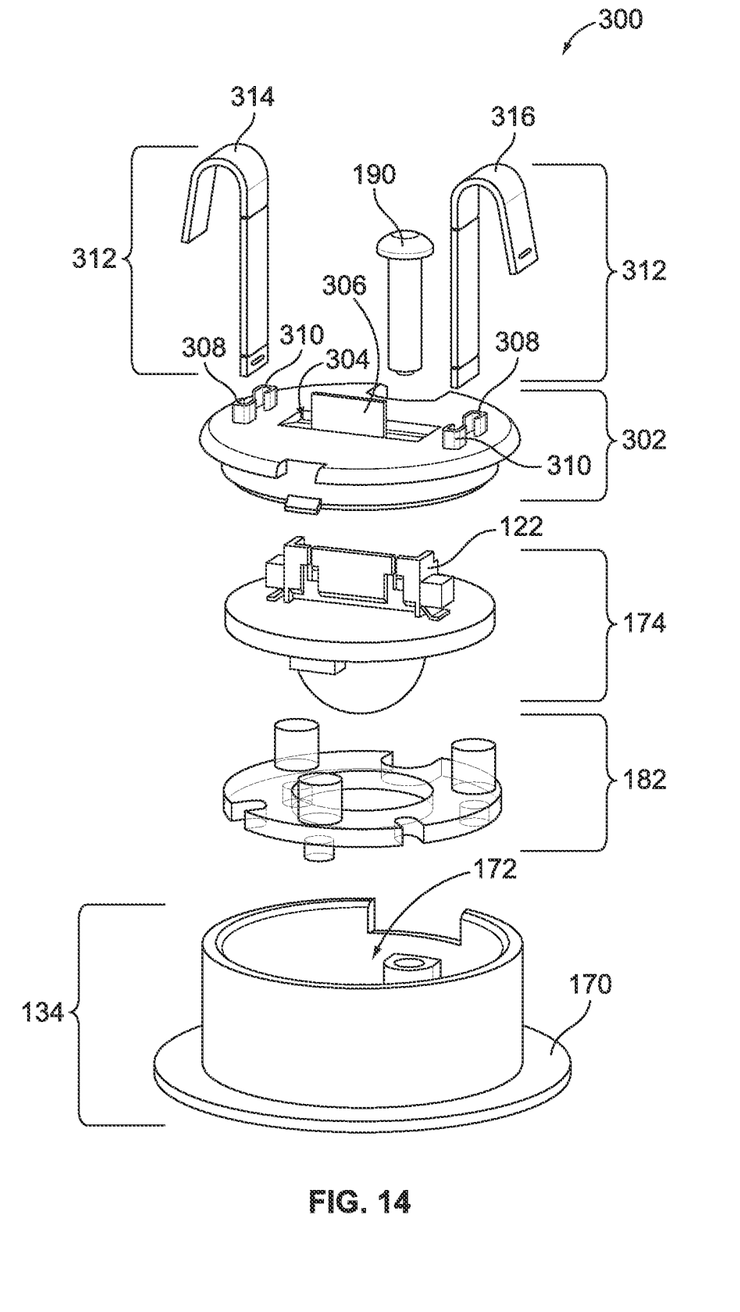
FIG. 14 is an exploded view of a sensor module formed in accordance with an alternative embodiment.

FIG. 14 is an exploded view of a sensor module 300 formed in accordance with an alternative embodiment. Components of the sensor module 300 that are the same as the components of the sensor module 104 are referenced using the same reference numbers. The sensor module 300 includes the housing 134 having the mounting surface 170. The sensor assembly 174 and the light pipe assembly 182 are positioned within the cavity 172 of the housing 134.

A module cover 302 is configured to be coupled to the housing 134 to secure the sensor assembly 174 and the light pipe assembly 182 within the cavity 172 of the housing 134. The module cover 302 is secured to the housing 134 with the screw 190. The module cover 302 includes an opening 304 to receive the sensor connector 122 of the sensor assembly 174. A strain relief 306 is positioned adjacent to the opening 304 to secure to the cable assembly 124 (shown in FIG. 1).

The module cover 302 includes fixed components 308. The fixed components 308 include slots 310 that are configured to receive moveable components 312. The moveable components 312 include a first moveable component 314 and a second moveable component 316.

Figure 15:
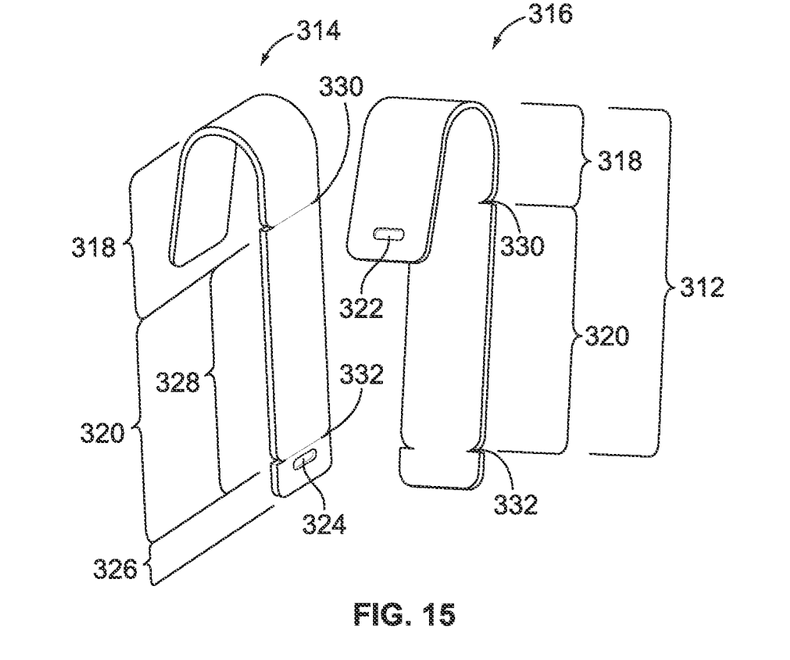
FIG. 15 is a side perspective view of the moveable components shown in FIG. 14.

FIG. 15 is a side perspective view of the moveable components 312. The moveable components 312 include a short end 318 and a long end 320. A short protrusion 322 is formed on the short end 318 of each moveable component 312, as illustrated on the second moveable component 316. A long protrusion 324 is formed on the long end 320 of each moveable component 312, as illustrated on the first moveable component 314. The short protrusion 322 and the long protrusion 324 are configured to form an interference fit with the fixed components 308 of the module cover 302.

The long end 320 of each moveable component 312 includes an end portion 326 and an intermediate portion 328. The intermediate portion 328 is joined to the short end 318 at a first score line 330. The intermediate portion 328 may be separated from the short end 318 at the first score line 330. The end portion 326 is joined to the intermediate portion 328 at a second score line 332. The end portion 326 may be separated from the intermediate portion 328 at the second score line 332.

Figure 16:
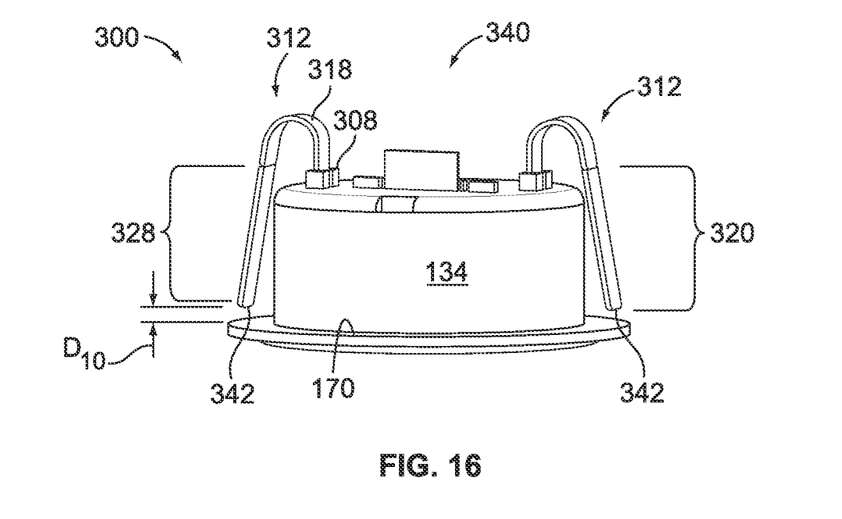
FIG. 16 is a side perspective view of the sensor module shown in FIG. 14 and having the moveable components in a first orientation.

FIG. 16 is a side perspective view of the sensor module 300 with the moveable components 312 in a first orientation 340. In the first orientation 340, the short ends 318 of the moveable components 312 are secured to the fixed components 308. The short protrusions 322 (shown in FIG. 15) form an interference with the fixed components 308. The end portions 326 (shown in FIG. 15) of the long end 320 are separated from the intermediate portions 328 at the second score line 332 (shown in FIG. 15). A mounting surface 342 is formed on the intermediate portion 328 of each moveable component 312. The mounting surfaces 342 of the moveable components 312 are positioned a distance $D_{10}$ from the mounting surface 170 of the housing 134. The distance $D_{10}$ may be configured to secure the sensor module 300 to a thin substrate (not shown). For example, the distance $D_{10}$ may be configured to secure the sensor module 300 to a substrate such as sheet metal or the like. When the sensor module 300 is secured to the substrate, the mounting surface 170 of the housing 134 and the mounting surfaces 342 of the moveable components 312 abut opposite sides of the substrate to secure the sensor module 300 to the substrate.

Figure 17:
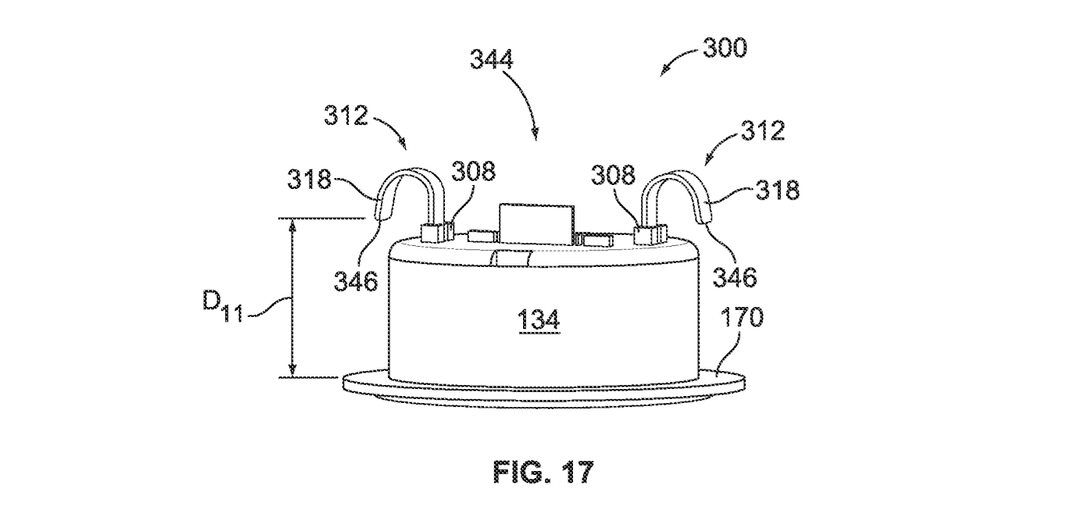
FIG. 17 is a side perspective view of the sensor module shown in FIG. 14 and having the moveable components in a second orientation.

FIG. 17 is a side perspective view of the sensor module 300 with the moveable components 312 in a second orientation 344. In the second orientation 344, the short ends 318 of the moveable components 312 are secured to the fixed components 308. The short protrusions 322 (shown in FIG. 15) form an interference with the fixed components 308. The intermediate portions 328 (shown in FIG. 15) of the long ends 320 (shown in FIG. 15) are separated from the short ends 318 of the moveable components at the first score line 330 (shown in FIG. 15). Mounting surfaces 346 are formed on the short ends 318 of the moveable components 312. The mounting surfaces 346 of the moveable components 312 are positioned a distance $D_{11}$ from the mounting surface 170 of the housing 134. The distance $D_{11}$ may be configured to secure the sensor module 300 to a substrate such as dry wall, a ceiling panel, or the like. In one embodiment, the distance $D_{11}$ may be approximately one half of an inch. When the sensor module 300 is secured to the substrate, the mounting surface 170 of the housing 134 and the mounting surfaces 346 of the moveable components 312 abut opposite sides of the substrate to secure the sensor module 104 to the substrate.

Figure 18:
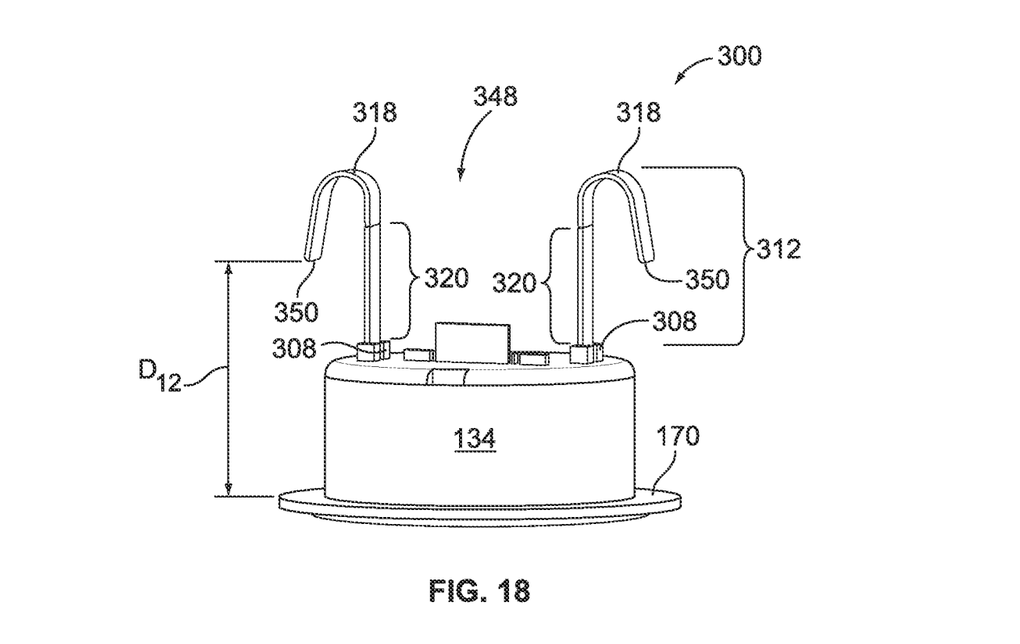
FIG. 18 is a side perspective view of the sensor module shown in FIG. 14 and having the moveable components in a third orientation.

FIG. 18 is a side perspective view of the sensor module 300 with the moveable components 312 in a third orientation 348. In the third orientation 348, the long ends 320 of the moveable components 312 are secured to the fixed components 308. The long protrusions 324 (shown in FIG. 15) form an interference with the fixed components 308. Mounting surfaces 350 are formed on the short ends 318 of the moveable components 312. The mounting surfaces 350 of the moveable components 312 are positioned a distance $D_{12}$ from the mounting surface 170 of the housing 134. The distance $D_{12}$ may be configured to secure the sensor module 300 to a substrate such as dry wall, a ceiling panel, or the like. In one embodiment, the distance $D_{12}$ may be approximately three fourths of an inch. When the sensor module 300 is secured to the substrate, the mounting surface 170 of the housing 134 and the mounting surfaces 350 of the moveable components 312 abut opposite sides of the substrate to secure the sensor module 104 to the substrate.

Figure 19:
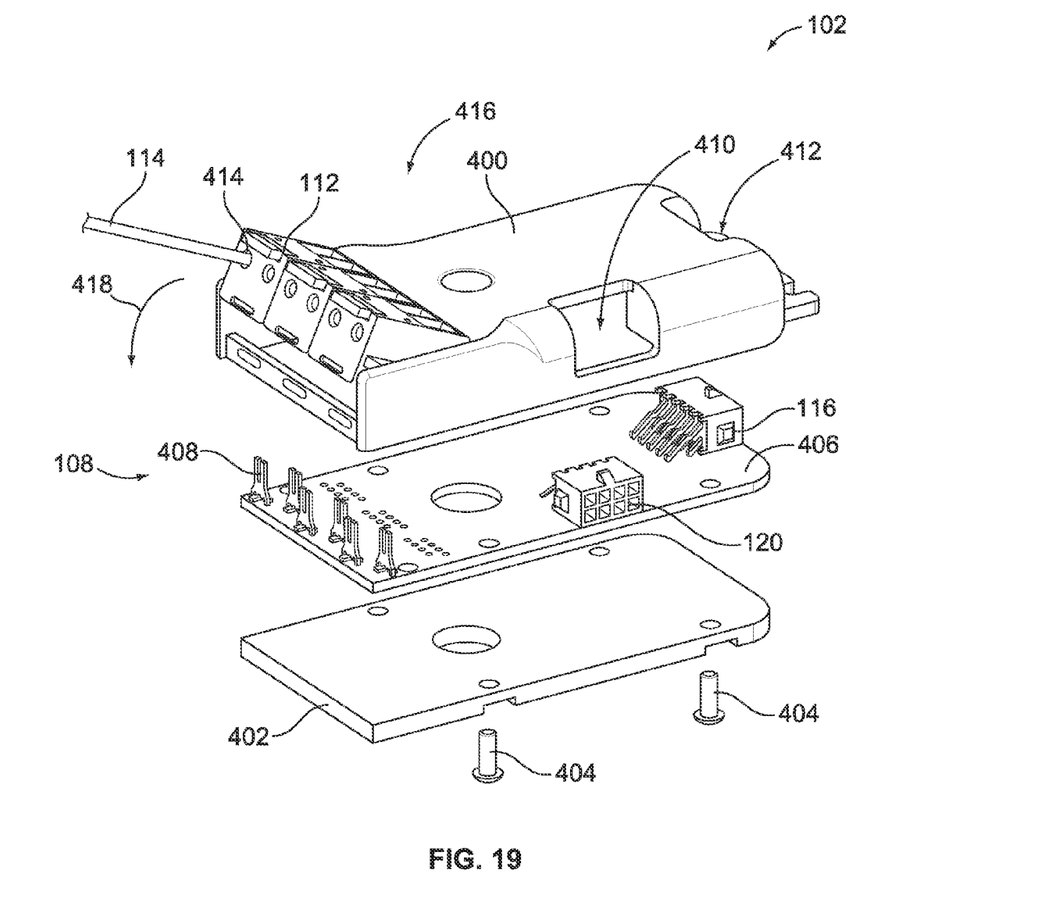
FIG. 19 is an exploded view of the control module shown in FIG. 1.

FIG. 19 is an exploded view of the control module 102. The control module 102 includes a housing 400 and a cover 402. The cover 402 is configured to secure to the housing 400 with screws 404. A circuit board 406 is configured to be secured within the housing 400. The lighting termination 116 and the sensor connector 120 are electrically coupled to the circuit board 406. Terminals 408 are electrically coupled to the circuit board 406 at the power end 108 of the control module 102. The terminals 408 are configured to couple to the wires 114. The circuit board 406 may be populated with additional electrical components (not shown).

The power termination 112 is joined to the housing 400 at the power end 108 of the control module 102. The housing 400 includes a sensor opening 410 and a lighting opening 412. When the circuit board 406 is secured within the housing 400, the sensor connector 120 is positioned within the sensor opening 410 and the lighting termination 116 is positioned within the lighting opening 412. The terminals 408 are aligned with openings 414 in the power termination 112. In the illustrated embodiment, the power termination 112 is shown in an open position 416. The wires 114 are inserted into the openings 414 in the power termination 112 in the open position 416. The power terminations 112 are then rotated in the direction of arrows 418 into a closed position (as illustrated in FIG. 1). In the closed position, the wires 114 engage the terminals 408 to create an electrical connection.

Figure 20:
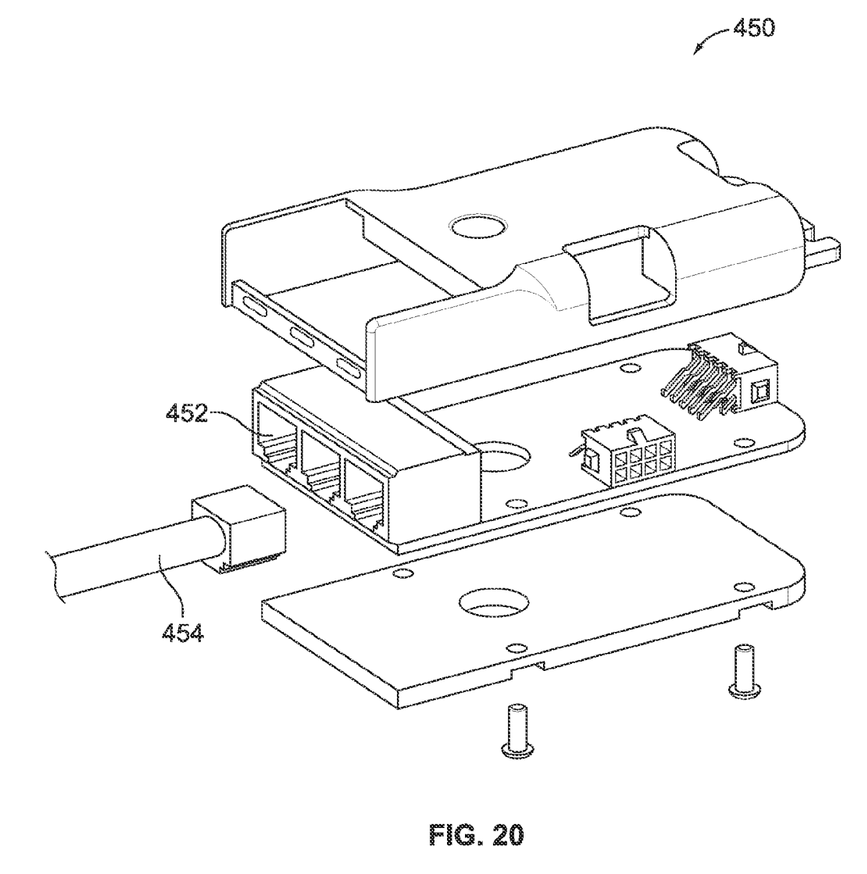
FIG. 20 is an exploded view of a control module formed in accordance with another embodiment.

FIG. 20 is an exploded view of a control module 450 formed in accordance with another embodiment. Components of the control module 450 that are the same as the control module 102 are referenced using the same reference numbers. The control module 450 includes power terminations 452. The power terminations 452 are modular jack connectors that are configured to receive a cable 454 to provide power to the control module 450.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A sensor module comprising:
    a housing having a top and a bottom, a mounting surface positioned proximate to the bottom of the housing;
    a sensor positioned within the housing;
    a cover assembly removably coupled to the housing and fixed relative to the housing, the cover assembly comprising a fixed component extending therefrom, the fixed component fixed in position relative to the housing when the cover assembly is coupled to the housing; and
    a moveable component having a mounting surface, the moveable component selectively coupled to the fixed component to selectively position the moveable component relative to the cover assembly and the housing to variably position the mounting surface of the moveable component relative to the mounting surface of the housing.

2. The sensor module of claim 1, wherein the mounting surface of the moveable component and the mounting surface of the housing are configured to engage substrates of varying thickness, the mounting surface of the moveable component being variably positionable with respect to the mounting surface of the housing to accommodate the varying thicknesses of the substrates.

3. The sensor module of claim 1, wherein the fixed component is integrally formed with the cover assembly.

4. The sensor module of claim 1, wherein the cover assembly is discrete from the housing, the cover assembly received in the housing and holds the sensor within the housing.

5. The sensor module of claim 1, wherein the moveable component is positionable in one of a first orientation or a second orientation with respect to the fixed component, the mounting surface of the moveable component positioned a first distance from the mounting surface of the housing in the first orientation, the mounting surface of the moveable component positioned a second distance from the mounting surface of the housing in the second orientation, the first distance being different than the second distance.

6. The sensor module of claim 1, wherein the moveable component is rotated to variably position the mounting surface of the moveable component relative to the mounting surface of the housing.

7. The sensor module of claim 1, wherein the moveable component further comprises latching surfaces, the mounting surface of the moveable component variably positionable with respect to the mounting surface of the housing by selectively coupling the fixed component to one of the latching surfaces.

8. The sensor module of claim 1, wherein the moveable component further comprises a flange extending therearound, the mounting surface of the moveable component formed on the flange.

9. The sensor module of claim 1, wherein the moveable component further comprises a short end and a long end, the mounting surface of the moveable component variably positionable with respect to the mounting surface of the housing by coupling one of the short end or the long end of the moveable component to the fixed component.

10. The sensor module of claim 1, wherein the moveable component further comprises at least one score line, the mounting surface of the moveable component variably positionable with respect to the mounting surface of the housing by breaking the moveable component along at least one score line.

11. The sensor module of claim 1, wherein the cover assembly is fixed relative to the housing after the sensor is positioned within the housing and before the moveable component is selectively coupled to the fixed component of the cover assembly.

12. A sensor module comprising:
    a housing having a top and a bottom, a mounting surface positioned proximate to the bottom of the housing;
    a sensor positioned within the housing;
    a cover assembly removably coupled to the housing and fixed relative to the housing, the cover assembly comprising a latch extending therefrom, the latch fixed in position relative to the housing when the cover assembly is coupled to the housing; and
    a sleeve having a mounting surface, the sleeve selectively coupled to the latch to selectively position the sleeve relative to the cover assembly and the housing to variably position the mounting surface of the sleeve relative to the mounting surface of the housing.

13. The sensor module of claim 12, wherein the mounting surface of the sleeve and the mounting surface of the housing are configured to engage substrates of varying thickness, the mounting surface of the sleeve being variably positionable with respect to the mounting surface of the housing to accommodate the varying thicknesses of the substrates.

14. The sensor module of claim 12, wherein the sleeve is rotated to variably position the mounting surface of the sleeve relative to the mounting surface of the housing.

15. The sensor module of claim 12, wherein the sleeve includes latching surfaces, the mounting surface of the sleeve variably positionable with respect to the mounting surface of the housing by selectively coupling the latch to one of the latching surfaces.

16. The sensor module of claim 12, wherein the sleeve further comprises a flange extending therearound, the mounting surface of the sleeve formed on the flange.

17. A sensor subsystem comprising:
    a control module;
    a sensor module including:
        a housing having a top and a bottom, a mounting surface positioned proximate to the bottom of the housing,
        a sensor positioned within the housing,
        a cover assembly removably coupled to the housing and fixed relative to the housing, the cover assembly comprising a fixed component extending therefrom, the fixed component fixed in position relative to the housing when the cover assembly is coupled to the housing, and a moveable component having a mounting surface, the moveable component selectively coupled to the fixed component to selectively position the moveable component relative to the cover assembly and the housing to variably position the mounting surface of the moveable component relative to the mounting surface of the housing; and a cable assembly coupling the control module to the sensor module.

18. The sensor subsystem of claim 17, wherein the cable assembly is removeably coupled to at least one of the control module or the sensor module.

19. The sensor subsystem of claim 17, wherein the control module is configured to be installed remotely from the sensor module.

20. The sensor subsystem of claim 17, wherein the moveable component is positionable in one of a first orientation or a second orientation with respect to the fixed component, the mounting surface of the moveable component positioned a first distance from the mounting surface of the housing in the first orientation, the mounting surface of the moveable component positioned a second distance from the mounting surface of the housing in the second orientation, the first distance being different than the second distance.

* * * * *